United States Patent [19]
Megginson et al.

[11] Patent Number: 4,890,699
[45] Date of Patent: Jan. 2, 1990

[54] WET DISC FRICTION BRAKE WITH CASING RODS EXTENDING THROUGH STATOR BORES

[75] Inventors: George W. Megginson, Thomasville, Ala.; Philip D. Redenbarger, Centerpoint; David H. First, Bloomington, both of Ind.

[73] Assignee: The B. F. Goodrich Company, Akron, Ohio

[21] Appl. No.: 361,899

[22] Filed: Jun. 5, 1989

Related U.S. Application Data

[63] Continuation of Ser. No. 225,124, Jul. 28, 1988, abandoned.

[51] Int. Cl.⁴ .................. B60T 1/06; F16D 55/36; F16D 65/78
[52] U.S. Cl. .................. 188/18 A; 188/71.5; 188/264 E
[58] Field of Search .................. 188/71.6, 71.5, 264 D, 188/264 E, 264 CC, 218 XL, 367, 369, 73.31, 18 A; 192/85 AA, 70.12, 70.13, 113 B

[56] References Cited

U.S. PATENT DOCUMENTS 3,730,301  5/1973  Heck et al. .................. 188/71.6

FOREIGN PATENT DOCUMENTS 804803  11/1936  France .................. 188/369
1113391  3/1956  France .................. 188/369

Primary Examiner—Robert J. Oberleitner
Attorney, Agent, or Firm—Joseph Januszkiewicz

[57] ABSTRACT

A separable casing or housing for a liquid cooled disc brake assembly wherein the separable parts of the casing are held together by a plurality of circumferentially spaced rods. The casing provides a sealed chamber in which a plurality of axially spaced rotor discs are interleaved with a plurality of stator discs. The rods also extend axially through the stator discs radially inwardly of their peripheral circumference and thus provide a reactive stationary force for the braking action. The rotor discs are splined connected to the rotating wheel that is to be braked.

3 Claims, 3 Drawing Sheets

WET DISC FRICTION BRAKE WITH CASING RODS EXTENDING THROUGH STATOR BORES

This is a continuation of application Ser. No. 225,124 filed July 28, 1988, now abandoned.

BACKGROUND OF THE INVENTION

This invention relates to brakes and more particularly to wet or liquid cooled disc brake assembly.

In wet disc brake assemblies, a plurality of brake discs have alternate brake discs such as the rotor discs splined to the rotating wheel of the vehicle while the nonrotating alternate brake discs, referred to as stator discs, are coupled to the nonrotating axle support housing via a splined connection. Such stators and rotors are housed or immersed in a fluid tight support housing, or casing, which casing provides a fluid chamber for the oil which is used to transfer the heat energy away from the brake friction surfaces.

The general object of the present invention is to provide a novel means for anchoring the stator brake discs together, which anchoring means allows the discs to slide axially while also interconnecting elements of the nonrotating support casing to provide an effective means for reducing the manufacturing cost of the brakes since it makes the manufacturing of splines unnecessary while permitting greater tolerances in the manufacture of the brake assemblies.

SUMMARY OF THE INVENTION

The present invention is directed to a liquid cooled disc brake assembly wherein a liquid sealed casing provides the chamber in which the interleaved rotor discs and stator discs are housed. The rotor discs are splined for connection to the wheel drive means while the stator discs are interconnected by a plurality of circumferentially spaced rods that extend through the outer face of the stator discs, radially inwardly of the periphery. In addition the plural rods interconnect the separable portions of the sealed casing to provide a unitary sealed housing.

DETAILED DESCRIPTION OF THE PREFERRED EMBODIMENT

Figure 1:
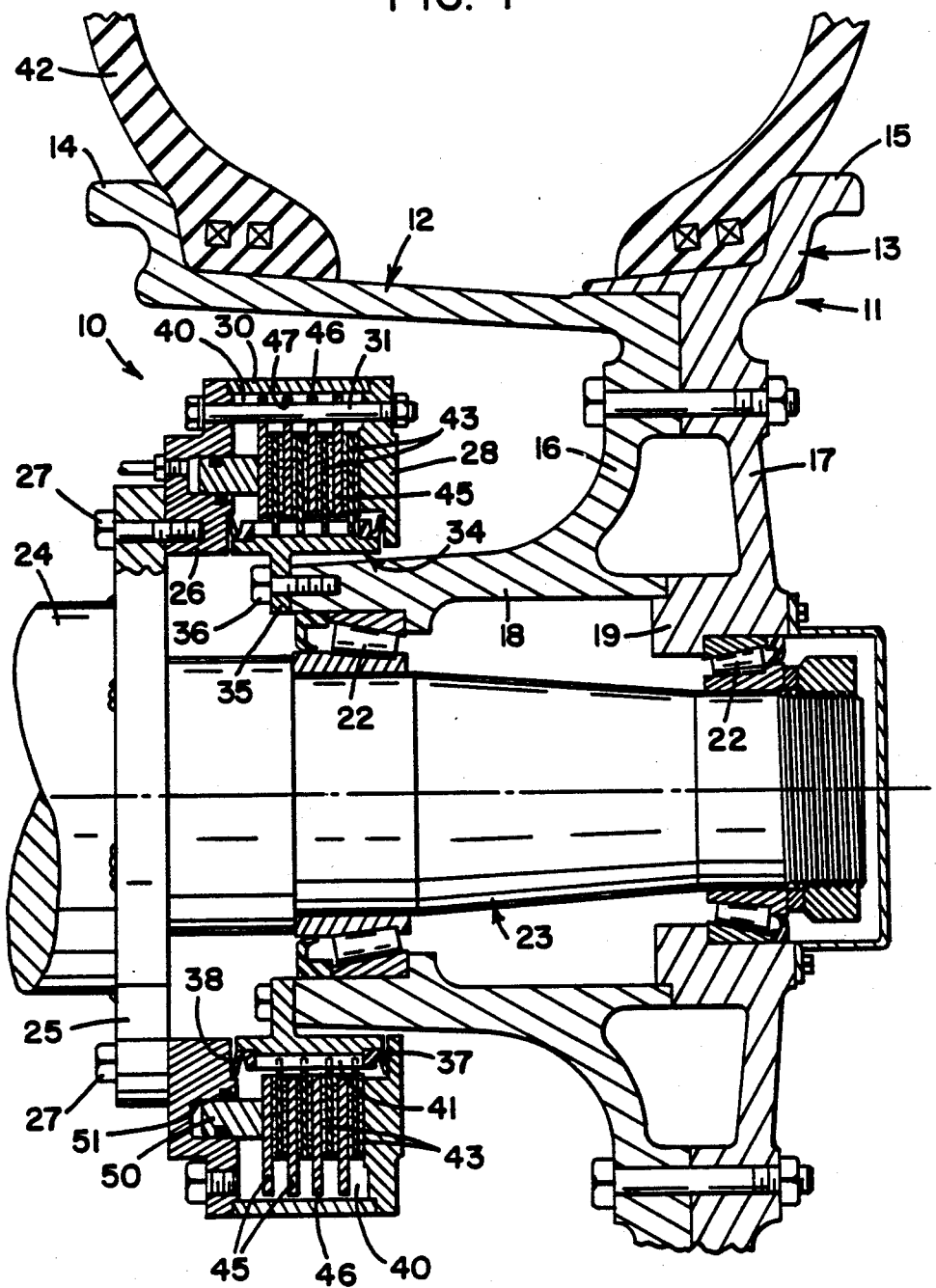
FIG. 1 is a fragmentary cross sectional view of a brake assembly and casing embodying the invention shown as mounted on the rim of a vehicle.

Referring to the drawings wherein like reference numerals designate like or corresponding parts throughout the several views, there is shown in FIG. 1 a friction brake mechanism 10 mounted on a cylindrical wheel 11 having matching wheel sections 12 and 13. Each of the wheel sections 12 and 13 has rim members 14 and 15, web members 16 and 17 and hub members 18 and 19 respectively. The wheel sections 12 and 13 are fastened together by suitable bolts disposed in aligned bores within web members 16 and 17.

The hub members 18 and 19 are supported for rotation on bearings 22 mounted on a nonrotatable axle member 23. Mounted on a base 24 of axle member 23 is a torque flange 25. An annular plate member or end plate 26 is secured to the flange 25 via bolts 27. A second annular plate member or end plate 28 is mounted axially spaced from annular plate member 26 and is interconnected thereto by a cylindrical housing or cover plate 30. Plate members 26 and 28 are interconnected together by a plurality of circumferentially spaced longitudinally extending rods or bolts 31.

A cylindrical support 34 having a circumferentially extending flange 35 is connected to hub member 18 as via bolts 36. The respective side portions of cylindrical support 34 has annular seals 37–38 mounted thereon, which frictionally engage the inner recessed wall surfaces of annular plate members or end plates 26 and 28 to form a closed annular chamber 40. The annular plate members 26, 28, cover plate 30 and the cylindrical support 34 cooperate to form a closed fluid tight housing or casing, with the plate members 26, 28 and the cover plate 30 forming the nonrotating support while the cylindrical support 34 forms the rotating support to which the rotor discs are splined.

Figure 2:
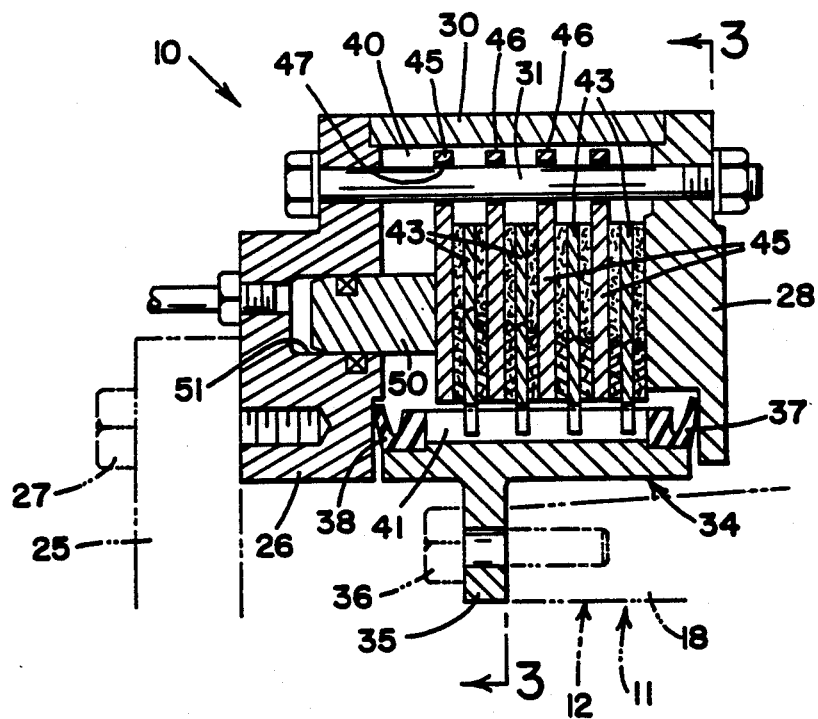
FIG. 2 an enlarged cross sectional view of the stator and rotor brake discs as mounted on their respective nonrotating support and the splined connection to the rotating wheel.
Figure 3:
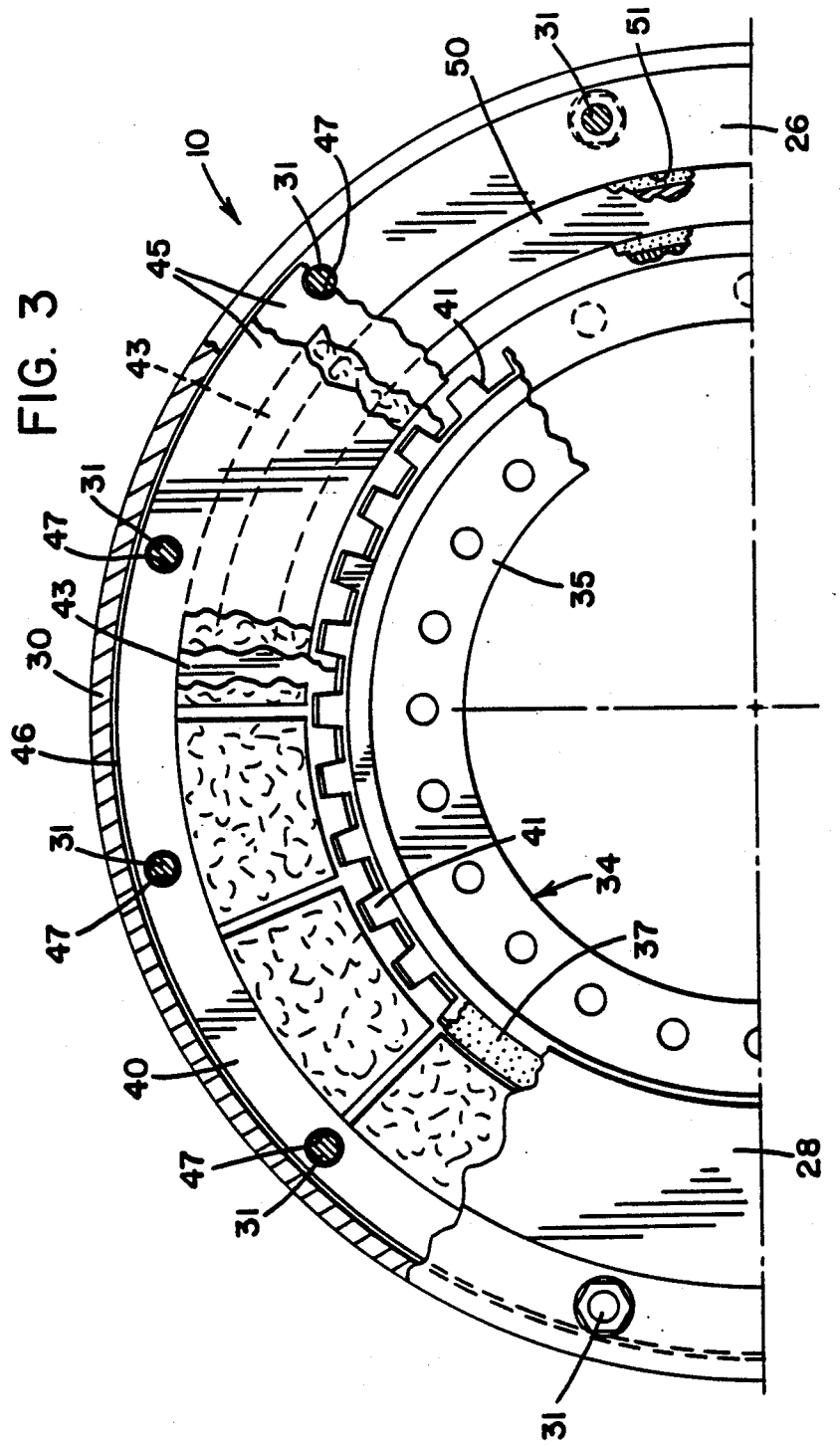
FIG. 3 is a fragmentary elevational view of the brake assembly and casing taken on line 3—3 of FIG. 2.

The outer circumferential surface of the cylindrical support 34 is provided with a plurality of circumferentially spaced splines 41, which splines 41 extend in an axial direction. Thus as the rim members 14–15 and its tire 42 mounted thereon rotates, the hub members 18 and 19 as well as cylindrical support 34 and its splines 41 will rotate with it along with plural rotor discs 43 splined thereto. The plural rotor discs 43 are thus mounted for rotation inside the chamber 40 and within the separable housing or casing composed of the end plates 26, 28, the cover plate 30 and cylindrical support 34 (FIG. 2). Such rotor discs 43 are adapted to move or translate axially within such casing.

Interleaved with the rotor discs 43 are stator discs 45. The respective peripheries 46 of the discs 45 are smooth and circumferentially extending. Each disc 45 has radially inwardly of such peripheries 46 a plurality of circumferentially spaced bores 47, all equidistant from the central axis of the stator discs 45. The rods 31 extend through the respective bores 47 of the stator discs 45 while also interconnecting the respective end plates 26 and 28, thus providing a means for interconnecting the casing while providing an anchor for the stator discs 45 to take up the reactive forces during the braking operation. Sufficient clearance space is provided between the bores 47 and the rods 31 to permit axial movement of the stator discs for the braking operation.

A pressure annular ring 50 is mounted in the end plate 26 to provide a means for transmitting an axial force to compress the rotor discs 43 and the stator discs 45 into abutting frictional engagement. The stator discs 45 frictionally oppose rotation of the rotor discs 43 by contact of their working faces.

As seen in FIGS. 1 and 2, the end plate 26 has an annular groove 51 which houses the pressure annular ring 50. Suitable conduit means are provided to supply actuating or pressurizing fluid to the chamber defined by the groove 51 and the pressure ring 50 to apply the brake actuating force to annular ring 50 which is adapted to slide axially within groove 51 and bears against nearest stator disc 45 which is then moved axially to the right as viewed in FIG. 2 to begin the brake application. Continued pressurization of annular groove 51 will amplify the braking application as is well known in the art.

With the use of the rods 31 to provide the means against which the stator discs 45 resist rotation while permitting axial movement of such stator discs 45 in conjunction with the bolts or rods 31 also being used to maintain the separable casing into a unitary housing simplifies the manufacture of the brake assembly as it eliminates the need for the costly manufacturing of splines in the stator discs while permitting greater tolerances in the manufacture in the brake assemblies.

It will be apparent that, although a specific embodiment of the invention has been described in detail, the invention is not limited to such specifically illustrated and described construction since variations may be made without departing from the principles of the invention.

We claim:

1. A liquid-cooled disc brake assembly consisting of a casing with a chamber having a quanity of liquid disposed therin; said casing consisting of an inner annular flange, a cylindrical housing and an outer annular flange; said casing being held together as an integral unit by a plurality of circumferentially spaced rods, said rods extend through said annular flanges and securely retain said flanges to said cylindrical housing that acts as a spacer; said rods extend through said chamber; a rotatable wheel with a cylindrical support; said cylindrical support journaled for rotation between the radial innermost portions of said annular flanges to define said chamber; annular seals mounted between said cylindrical support and said radial innermost portions of said annular flanges to seal said chamber for the retention of fluid within said chamber; a plurality of rotor discs mounted in said casing for rotation relative to said casing about an axis or rotation within said casing, means for connecting said rotor discs via splines to said cylindrical support which is connected to said rotatable wheel which is to be selectively braked; a plurlaity of stator discs disposed within said casing and being interleaved with said rotor discs for relative movement along said axis of rotation, all of said stator discs have a circumferentially extending outer periphery, each of said stator discs and each of said rotor discs having solid annular braking surfaces, means for moving said rotor discs and said stator discs toward each other to effect a braking action to said rotatable wheel, all of said stator discs having a plurality of circumferentially spaced bores lying closely adjacent to said outer periphery of said stator discs but radially inwardly thereof, said rods being circumferentially spaced and extending through said casing and through said bores of said stators in a direction parallel to said axis of rotation, each of said rod having their radial outermost portion disposed radially inwardly of said outer periphery of all of said stators; and a liquid is located within said fluid tight chamber for the transfer of heat energy away from annualr braking surfaces.

2. A liquid-cooled disc brake assembly as set forth in claim 1 wherein said means for moving said rotor discs and said stator discs toward each other includes an annular piston actuated by hydraulic means.

3. A liquid-colled disc brake assembly as set forth in claim 2 wherein the coolant for said liquid is an oil base liquid.

* * * * *